United States Patent
Chi

(10) Patent No.: US 7,675,419 B2
(45) Date of Patent: Mar. 9, 2010

(54) SYSTEM AND METHOD OF MANAGING SHARED PRINTER WITH RFID

(75) Inventor: Won-young Chi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 11/490,024

(22) Filed: Jul. 21, 2006

(65) Prior Publication Data

US 2007/0018785 A1    Jan. 25, 2007

(30) Foreign Application Priority Data

Jul. 25, 2005   (KR) ...................... 10-2005-0067279

(51) Int. Cl.
    *G08B 13/14* (2006.01)
(52) U.S. Cl. .................... 340/572.1; 340/5.2; 340/5.21; 340/5.61; 340/5.8; 340/539.1; 340/825.69; 358/1.15
(58) Field of Classification Search ............. 340/572.1, 340/572.4, 5.2, 5.21, 5.61, 5.8, 5.81, 5.86, 340/572.3, 539.1, 825.49, 825.69; 358/400, 358/435, 468, 1.15
    See application file for complete search history.

(56) References Cited

U.S. PATENT DOCUMENTS

| | | | | |
|---|---|---|---|---|
| 4,930,011 A | * | 5/1990 | Kiewit .......................... | 725/10 |
| 5,629,981 A | * | 5/1997 | Nerlikar ...................... | 713/168 |
| 5,896,440 A | * | 4/1999 | Reed et al. .................. | 379/9.03 |
| 5,987,225 A | * | 11/1999 | Okano ........................ | 358/1.13 |
| 6,819,446 B1 | * | 11/2004 | Ogawa et al. .............. | 358/1.15 |
| 7,253,717 B2 | * | 8/2007 | Armstrong et al. ......... | 340/10.2 |
| 7,310,162 B2 | * | 12/2007 | Morris-Jones ............. | 358/1.15 |
| 2005/0078335 A1 | | 4/2005 | Morris-Jones | |
| 2005/0168769 A1 | * | 8/2005 | Kim et al. .................. | 358/1.14 |

FOREIGN PATENT DOCUMENTS

| | | |
|---|---|---|
| JP | 2000-318269 | 11/2000 |
| JP | 2002-240398 | 8/2002 |
| JP | 2004-168468 | 6/2004 |
| JP | 2004-302616 | 10/2004 |
| KR | 20-0334558 | 11/2003 |

OTHER PUBLICATIONS

Chinese Office Action dated Sep. 7, 2007 issued in CN 2006101371305.
"Instruction on Band Four Test for Computer", Sep. 30, 2004, p. 188, line 33-41.

* cited by examiner

*Primary Examiner*—Hung T. Nguyen
(74) *Attorney, Agent, or Firm*—Stanzione & Kim LLP

(57) ABSTRACT

A system and method of managing a shared printer with radio frequency identification (RFID) includes at least one RFID chip containing information about task permission for users, an RFID transceiver unit to periodically retrieve information about the RFID chip, a controller to determine whether to output a document based on task permission held by a user associated with the RFID chip retrieved by the RFID transceiver unit, and a printing unit to form images on a printing medium in response to a control signal from the controller. It is possible to allow, for example, printing and facsimile transmission by giving specific permission to each user and allows a manager to inspect a use specification by the RFID transceiver unit. The RFID transceiver unit is included in a printer and periodically retrieves information about an RFID chip and determines whether a document is to be output based on task permission held by a user associated with the retrieved RFID chip.

10 Claims, 3 Drawing Sheets

SYSTEM AND METHOD OF MANAGING SHARED PRINTER WITH RFID

CROSS-REFERENCE TO RELATED APPLICATIONS

This application claims the benefit of Korean Patent Application No. 10-2005-0067279, filed on Jul. 25, 2005, in the Korean Intellectual Property Office, the disclosure of which is incorporated herein in its entirety by reference.

BACKGROUND OF THE INVENTION

1. Field of the Invention

The present general inventive concept relates to a system and method of managing a shared printer with radio frequency identification (RFID), and more particularly, to a system and method of managing a shared printer in which information on an RFID chip is periodically retrieved by an RFID transceiver unit and whether to output a document is determined based on a task permission level held by a user associated with the RFID chip.

2. Description of the Related Art

In radio frequency identification (RFID) technology, information about all processes including manufacturing, distribution, management and consumption of products is stored in chip based RFID tags that are attached to the products to serve as transponders. The RFID tags transmit signals through an antenna. The signals are received by an RFID reader (transceiver) and are processed by an information processing system over at least one network.

A conventional RFID system includes an RFID reading system having an RFID chip (e.g., RFID tag) serving as a transponder (a wireless transceiver that responds to an external signal to automatically return a predetermined signal) storing RFID information (e.g., information about a product to which the RFID tag is attached), an antenna for wireless transmission to and reception from the RFID tag (transponder), an RFID reader for receiving and reading RFID information included in the RFID tag, etc., at least one network over which the RFID reader provides the received and read RFID information from the RFID tag to at least one information processing system, and an RFID processing system having the information processing system performing information processing based on the RFID information from the RFID reader.

RFID systems may be classified into active RFID systems (e.g., powered readable and recordable RFID chips) and passive RFID systems (e.g., unpowered readable-only RFID chips) according to whether the system supplies a voltage to the RFID chip. RFID systems may be classified into low frequency RFID systems (e.g., with low frequency band between 30 KHz and 500 KHz) and high frequency RFID systems (e.g., with high frequency band between 850 MHz and 950 MHz or 2.4 GHz and 2.5 GHz) according to a radio frequency band. The RFID chips can range in size from 1 mm or less for ultra micro RFIDs to 1 cm for battery-installed RFID chips.

FIG. 1 is a diagram illustrating a conventional system for managing a shared printer.

Referring to FIG. 1, the conventional system for managing the shared printer includes a host computer 100, a printer server 110, a managing server 120, a printer 130, and a deposit machine or payment system 140. The system for managing the shared printer may further include a web-based remote managing system.

The host computer 100 stores various programs for enabling users to perform a word-processing task and a client program for a billing system. The host computer 100 allows the user to produce a document and print the produced document on the spot.

The printer server 110 receives printing data from the host computer 100 and controls the printer 130 to print the document.

The managing server 120 controls the printer server 110, which is one of local printer servers. The managing server 120 classifies, stores, and manages user information such as user IDs, passwords, the balance, and printer information such as printer states and printing history.

The printer 130 performs a printing task in response to an output command from the printer server 110.

The deposit machine 140 is used to put money in an account so that a user can perform the printing task using the billing system.

In the conventional system for managing the shared printer, a personal identification number (PIN) is input using the host computer 100 or a separate input device (not shown) to manage the shared printer 130. The PIN can easily be determined by other persons. Thus, a security device for preventing the PIN from being determined by others is required. However, these devices require expensive equipment, such as an iris recognition device and a fingerprint recognition device.

SUMMARY OF THE INVENTION

The present general inventive concept provides a system and method of managing a shared printer in which a radio frequency identification (RFID) transceiver unit included in the shared printer periodically retrieves information from an RFID chip and determines whether to output a document based on a task permission level held by a user associated with the retrieved RFID chip.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a system to manage a shared printer with radio frequency identification (RFID), the system including at least one RFID chip including information about a task permission level for users, an RFID transceiver unit to periodically retrieve information about the at least one RFID chip, a controller to determine whether to print a document based on the task permission level held by a user associated with the at least one RFID chip retrieved by the RFID transceiver unit, and a printing unit to print the document based on a control signal generated in accordance with the determination made by the controller.

The system may further include a memory unit to store log information including a user ID-specific printing count value after a printing task is completed.

The system may further include a server connected to the controller or the system over a network and an authenticating unit that is included in the server to authenticate a user ID associated with the RFID chip.

The authenticating unit may determine if the user ID retrieved by the RFID transceiver unit is a pre-stored ID or a new ID.

The controller may reduce the user ID-specific printing count value by a number of sheets printed and store the reduced user ID-specific printing count value in the memory unit after the printing task is completed when the user ID retrieved by the RFID transceiver unit is the pre-stored ID, and may store the information including the task permission level and the user ID-specific printing count value for the new ID in the memory unit when the user ID retrieved by the RFID transceiver unit is the new ID.

The system may further include a display unit to display the user ID-specific task log information stored in the memory unit and an indication as to whether the user ID is authenticated.

The RFID chip may be readable from and recordable thereto, and log information including the user ID-specific printing count value may be stored in the at least one RFID chip through the RFID transceiver unit.

The RFID chip may be readable only, and the log information including the user ID-specific printing count value may be stored in the memory unit after the printing task is completed, and when the user ID-specific printing count value stored in the at least one RFID chip is different from the user ID-specific printing count value in the memory unit, the user ID-specific printing count value used may be based on a preset setting.

The controller may give priority to a RFID chip having a highest permission level among a plurality of RFID chips when the information of the plurality of RFID chips is retrieved by the RFID transceiver unit.

The foregoing and/or other aspects and utilities of the present general inventive concept may also be achieved by providing a method of managing a shared printer with RFID, and the method includes periodically retrieving information of at least one RFID chip, with an RFID transceiver unit, determining whether to print a document based on task permission level held by a user associated with the RFID chip information retrieved by the RFID transceiver unit with a controller, and printing the document in response to a control signal generated in accordance with the determination made by the controller.

The method may further include storing log information including a user ID-specific printing count value in a memory after a printing task is completed.

The method may further include authenticating the user ID after the periodic retrieval of the RFID chip information.

The authenticating of the user ID may include determining if the user ID retrieved by the RFID transceiver unit is a pre-stored ID or a new ID.

The method may include reducing the user ID-specific printing count value by a number of sheets printed and storing the reduced user ID-specific printing count value in the memory unit after the printing task is completed when the user ID retrieved by the RFID transceiver unit is the pre-stored ID, and may store information including the task permission level and the user ID-specific printing count value for the user ID stored in the memory unit when the user ID retrieved by the RFID transceiver unit is the new ID.

The method may further include, when the user ID retrieved by the RFID transceiver unit has a manager permission level, displaying, with a display unit, user ID-specific task log information stored in the memory unit and an indication as to whether the user ID is authenticated.

The method may further include storing log information including the user ID-specific printing count value in the at least one RFID chip through the RFID transceiver unit where the at least one RFID chip is readable from and recordable thereto.

The method may further include storing the log information including the user ID-specific printing count value in the memory unit after the printing task is completed when the at least one RFID chip is a readable only RFID chip, and selecting the ID-specific printing count value based on a preset setting when the ID-specific printing count value stored in the at least one RFID chip is different from the user ID-specific printing count value in the memory unit.

The method may further include giving priority to the RFID chip having a highest task permission level among the plurality of the RFID chips when information of a plurality of the RFID chips is retrieved by the RFID transceiver unit.

The foregoing and/or other aspects and utilities of the present general inventive concept may also be achieved by providing a shared printer to print documents based on a task permission level of a user obtained through radio frequency identification (RFID) information, the shared printer including an RFID transceiver unit to periodically retrieve the RFID information including at least one of an ID of a user and the task permission level of one or more corresponding RFID chips and a controller to determine whether to perform a print task based on the retrieved RFID information and to control the printing by the shared printer based on the determination.

The foregoing and/or other aspects and utilities of the present general inventive concept may also be achieved by providing a system to manage a shared printer with RFID, including at least one RFID chip to transmit information, an RFID transceiver to receive the information transmitted from the at least one RFID chip, and a controller to control the shared printer to print a document based on the information transmitted from the at least one RFID chip.

The foregoing and/or other aspects and utilities of the present general inventive concept may also be achieved by providing a computer-readable recoding medium having a program recorded therein to perform a method of managing a shared printer with RFID, including periodically retrieving information of at least one RFID chip with an RFID transceiver unit, determining whether to output a document based on task permission held by a user associated with the RFID chip retrieved by the RFID transceiver unit with a controller, and forming an image in response to a control signal from the controller.

The foregoing and/or other aspects and utilities of the present general inventive concept may also be achieved by providing a method of controlling a shared printer with RFID to perform different tasks for users based on an authorized task permission level, the method including retrieving RFID chip information including user information from an external source and performing the printing task corresponding to the retrieved RFID chip information if the retrieved RFID chip information includes the task permission level authorized to perform the task.

The foregoing and/or other aspects and utilities of the present general inventive concept may also be achieved by providing a method of controlling a shared printer with RFID, the method including determining whether a plurality of RFID chips are detected, setting a task permission level to a highest permission level when the plurality of RFID chips are detected, performing a checking operation including checking whether any of the detected RFID chips have the task permission level that is the same as the set task permission level, and if there are RFID chips that have the task permission level that is the same as the set task permission level, performing a task related to each of the RFID chips having the task permission level that is the same as the set task permission level, otherwise re-setting the task permission level to a lower level by a predetermined value, repeating the checking operation until all task permission levels have been checked against the detected RFID chips, and repeating the determining of whether a plurality of RFID chips are detected after a predetermined period of time.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
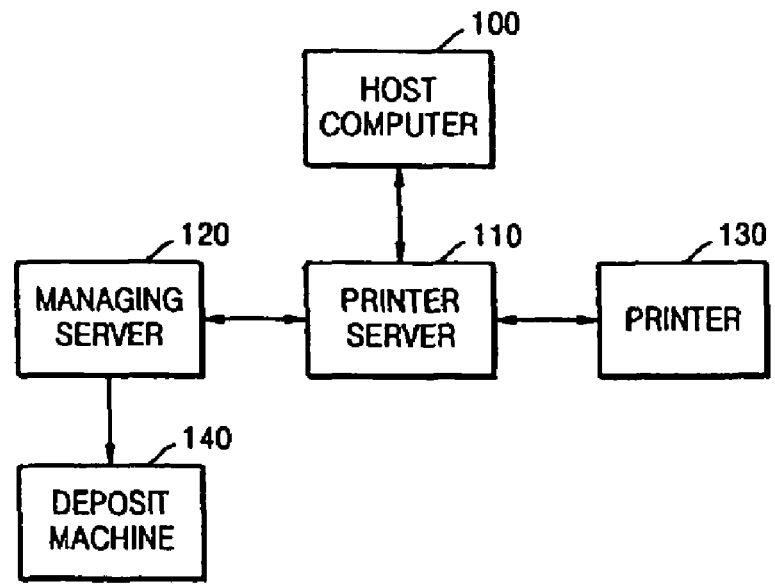
FIG. 1 is a block diagram illustrating a conventional system for managing a shared printer.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
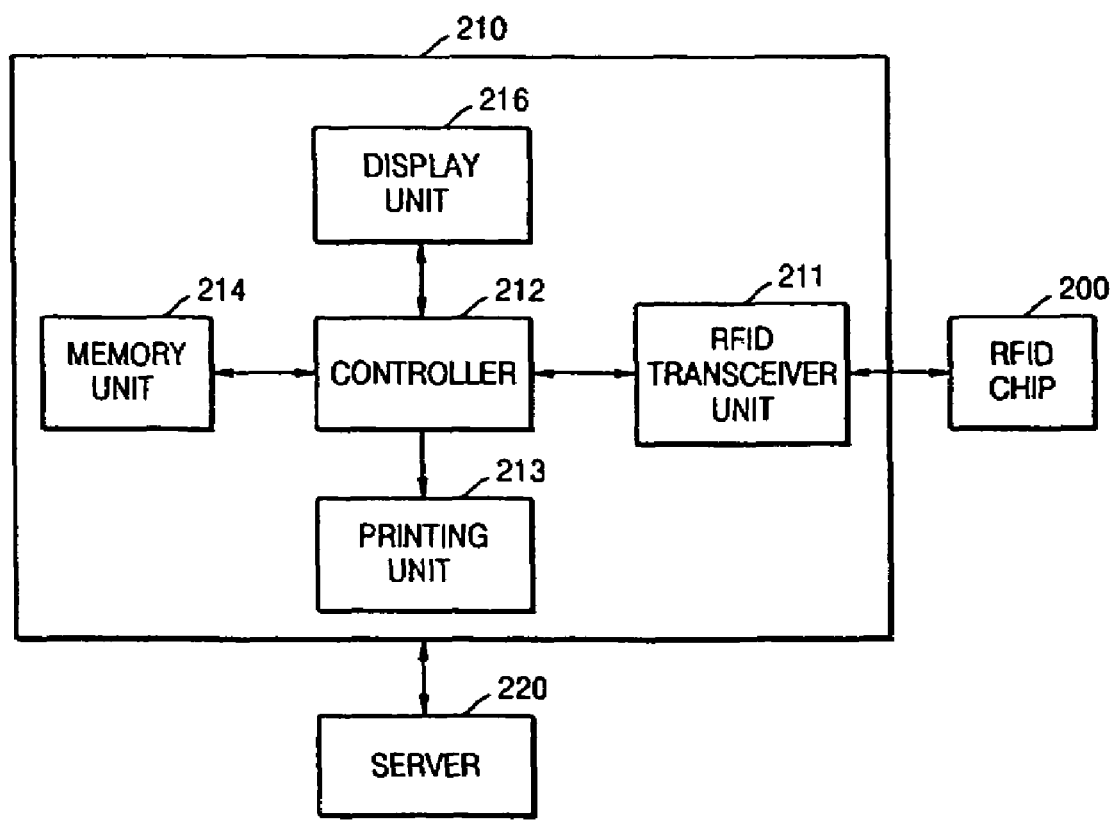
FIG. 2 is a block diagram illustrating a system to manage a shared printer with radio frequency identification (RFID) according to an embodiment of the present general inventive concept.

FIG. 2 is a block diagram illustrating a system to manage a shared printer 210 with radio frequency identification (RFID), according to an embodiment of the present general inventive concept. Referring to FIG. 2, the system to manage the shared printer 210 with RFID includes an RFID chip 200, the shared printer 210, and a server 220.

The RFID chip 200 can be a tag including a transponder. The RFID chip 200 may include information about a task permission level for respective users. In an embodiment of the present general inventive concept, the RFID chip 200 is readable from and recordable thereto, and log information including a printing count value is stored in the RFID chip 200 via the RFID transceiver unit 211 after a printing task is completed. The readable and recordable RFID chip 200 can be powered by an internal battery or an external power supply.

In another embodiment of the present general inventive concept, the RFID chip 200 may be readable only, so that the log information including the printing count value is stored in a memory unit 214 when the printing task is completed. If the stored log information that is stored in the RFID chip 200 is different from the log information stored in the memory unit 214, the log information stored in the memory unit 214 is given priority since the stored log information stored in the RFID chip 200 is not updated information.

The shared printer 210 includes an RFID transceiver unit 211, a controller 212, a printing unit 213, the memory unit 214 and a display unit 216.

The RFID transceiver unit 211 may periodically retrieve information from the RFID chip 200 through an antenna coil (not illustrated). The RFID transceiver unit 211 reads the information from the RFID chip 200 and also serves as an antenna for the system to manage the shared printer 210.

The controller 212 may receive the printing task from the server 220. The printing task may be assigned to a user ID. The user ID can be stored on the RFID chip 200 and included in the information of the RFID chip 200. In addition, the user ID may include or be associated to the task permission level assigned to the user. When the RFID transceiver unit 211 reads the RFID chip 200 information associated with the printing task, the controller 212 can determine whether to control the printing unit 213 to print a document based on the user's task permission level associated with the RFID chip 200 information retrieved by the RFID transceiver unit 211. That is, when the RFID transceiver unit 211 retrieves the RFID chip 200 information having the proper task permission level and the controller 212 receives the printing task corresponding to the same RFID chip 200 information, the controller 212 may control the shared printer 210 to print the document. When the controller 212 receives the printing task associated with a user ID that does not have the appropriate task permission level, the controller 212 will control the shared printer 210 to not print the document. The controller 212 may also include an authenticating unit (not illustrated).

The authenticating unit can determine whether the user ID retrieved by the RFID transceiver unit 211 from the RFID chip 200 information is a pre-stored ID or a new ID. The authenticating unit may be included in the server 220, which is connected to the system over a network (not illustrated).

If the user ID retrieved by the RFID transceiver unit 211 is the pre-stored ID, the controller 212 reduces an ID-specific printing count value by a number of sheets printed when the printing task is completed and stores the reduced ID-specific printing count value in the memory unit 214. If the user ID retrieved by the RFID transceiver unit 211 is the new ID, the controller 212 stores information including the task permission level and a printing count value for the ID in the memory unit 214. When the RFID transceiver unit 211 retrieves information from a plurality of RFID chips 200, the controller 212 gives priority to the RFID chip 200 having the highest task permission level.

The printing unit 213 prints data on a printing medium in response to a control signal from the controller 212. That is, the shared printer 210 performs the printing task. As discussed above, the controller 212 may not provide the control signal to the printing unit 213 to print the document, until the user's task permission level associated with the RFID chip 200 information is authenticated or otherwise confirmed.

The memory unit 214 stores log information including the ID-specific printing count value for each user ID after the printing task is completed.

The display unit 216 may display the user ID-specific task log information stored in the memory unit 214 and an indication as to whether the user ID is authenticated. When the user ID retrieved by the RFID transceiver unit 211 has a manager permission level, the controller 212 can control the display unit 216 to display the user ID-specific task log information stored in the memory unit 214. Thus, the user with the manager permission level can view the user ID-specific task log information of other users.

The server 220 is connected to the system to manage the shared printer 210 over the network and serves as a printer server or a managing server for the shared printer 210.

Figure 3:
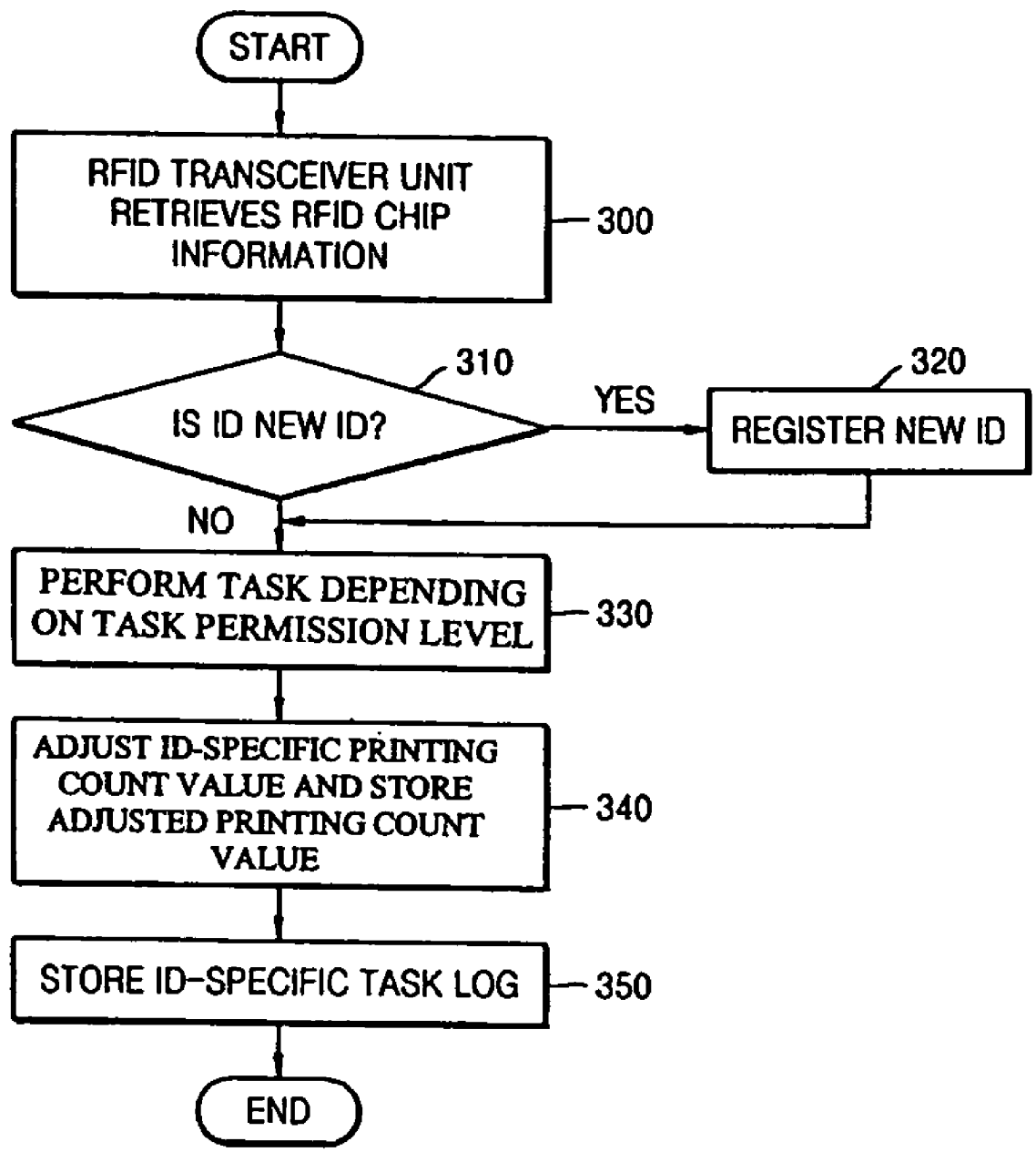
FIG. 3 is a flowchart illustrating a method of managing a shared printer with RFID according to an embodiment of the present general inventive concept.

FIG. 3 is a flowchart illustrating a method of managing the shared printer 210 of FIG. 2 with RFID according to an embodiment of the present general inventive concept. The method of managing the shared printer 210 with RFID will be described with reference to FIG. 2.

Referring to FIGS. 2 and 3, the RFID transceiver unit 211 retrieves RFID chip information about the RFID chip 200 at uniform time intervals (Operation 300). When the RFID transceiver unit 211 discovers the RFID chip 200 within a certain distance from the shared printer 210 or the RFID transceiver unit 211, the authenticating unit determines if the user ID of the RFID chip is a new ID (Operation 310). If the user ID of the RFID chip 200 is new, the authenticating unit registers the new ID and stores the RFID chip 200 information including the printing count value and the task permission level for the new ID in the memory unit 214 (Operation 320).

After the new ID is registered or if the user ID of the RFID chip 200 is pre-registered, the controller 212 controls the performance of the printing task based on the task permission level for the user ID (Operation 330). When the printing task has been performed, an ID-specific printing count value is adjusted and the adjusted printing count value is stored in the memory unit 214 (Operation 340).

After all the printing tasks have been completed, the ID-specific task log information is stored in the memory unit 214 (Operation 350). The ID-specific task log information is stored in the memory unit 214 in order to allow a manager to monitor the performance of an ID-specific task. The ID-specific task log information is displayed when the ID of the RFID chip 200 indicating the manager permission level is retrieved.

Figure 4:
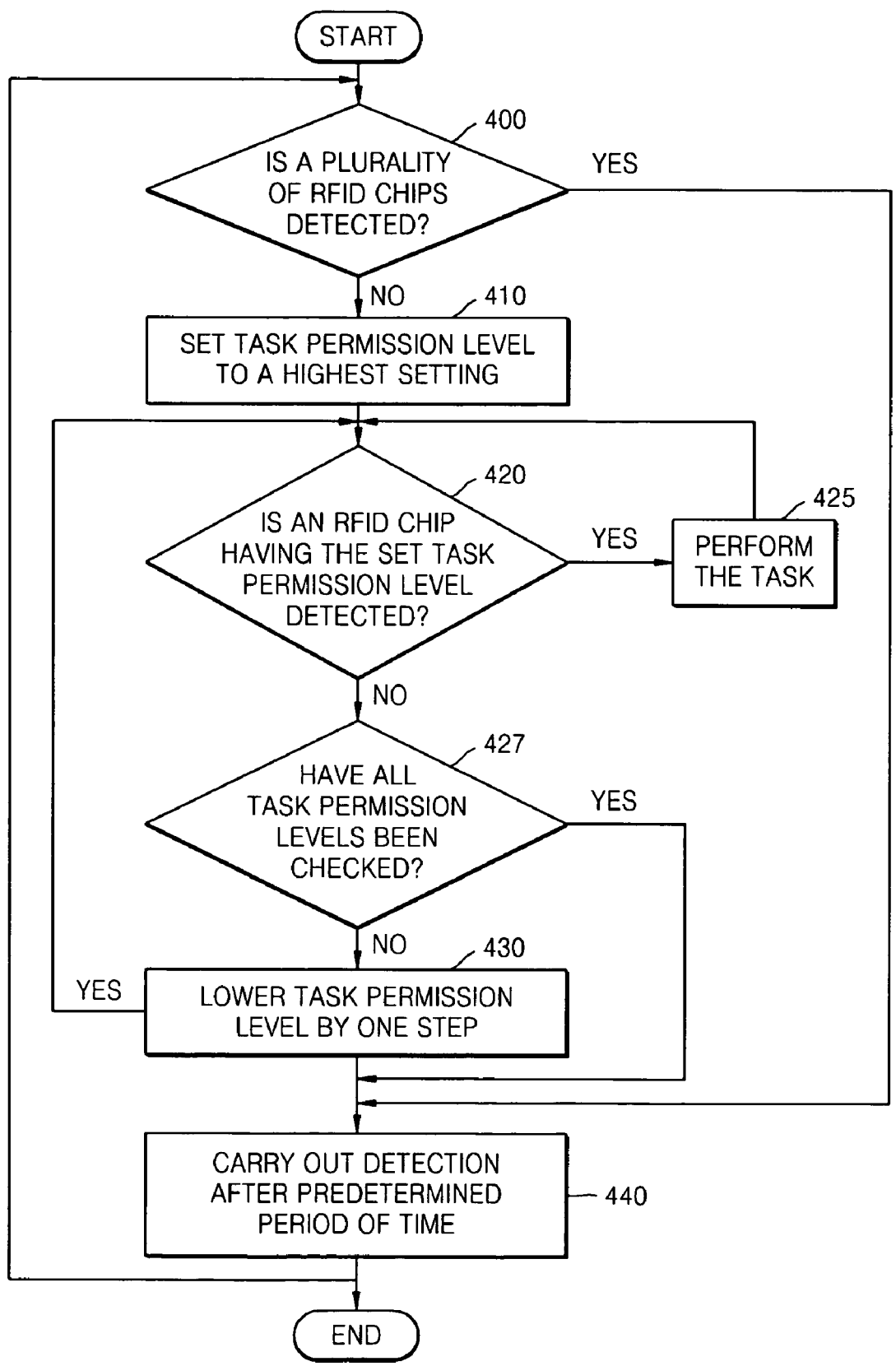
FIG. 4 is a flowchart illustrating a method of giving use rights in a shared printer when a plurality of RFID chips are detected according to an embodiment of the present general inventive concept.

FIG. 4 is a flowchart illustrating a method of giving use rights in the shared printer 210 when a plurality of RFID chips 200 are detected by the shared printer 210, according to an embodiment of the present general inventive concept.

Referring to FIG. 4, the RFID transceiver unit 211 determines if a plurality of RFID chips 200 are detected (Operation 400). If the plurality of RFID chips 200 are detected, the highest task permission level is set (Operation 410). If the RFID chip 200 having the highest task permission level is detected (Operation 420), a task related to the RFID chip 200 that matches the highest task permission level is performed (Operation 425). When the task is completed, it is determined if another RFID chip 200 having the highest task permission level exists (Operation 420), and if another RFID chip 200 exists having the highest task permission level, the task associated with the other RFID chip 200 having the highest task permission level is then performed. This determination is made until no RFID chips 200 having the highest task permission level remain. When it is determined that there are no remaining RFID chips 200 with the highest task permission level, the task permission level is lowered by a predetermined amount, for example, one step (Operation 430). Operation 420 is then repeated for the lower permission level.

If an RFID chip 200 having the lower task permission level is not detected (Operation 420), the permission level is again lowered by one step (Operation 430) and the plurality of the RFID chips 200 are re-checked to detect if any of the RFID chips 200 exist having the lower permission level (Operation420). Once the RFID chip 200 having the task permission level that corresponds to the lower task permission level is detected at Operation 420, the task is performed (Operation 425). Once the task permission level is at a lowest level and every task associated with the RFID chips 200 having the lowest task permission level is performed, a predetermined period of time elapses before detection of a plurality of RFID chips is carried out again (Operation 440). The method may also include an operation to check if all the task permission levels have been checked against the detected plurality of RFID chips 200 (Operation 427) before restarting the method to determine if the plurality of RFID chips 200 are detected (Operation 400). As a result of these operations, the shared printer 210 prints the documents for the plurality of RFID chips 200 in the order of the use rights, or task permission levels, associated with each of the plurality of RFID chips 200.

The general inventive concept may also be embodied as a computer-executed program, and implemented in a general-purpose digital computer that executes the program on a computer-readable recoding medium. Examples of the computer-readable recoding medium include a magnetic storage medium, such as a read only memory (ROM), a floppy disk and a hard disk; an optical reading medium such as a compact disc-read only memory (CD-ROM) and a digital versatile disk (DVD), and a storage medium such as a carrier wave e.g., transmission through the Internet.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A shared printer to print documents based on a task permission level of a user obtained through radio frequency identification (RFID) information, the shared printer comprising:
  an RFID transceiver unit to periodically retrieve the RFID information including at least one of an ID of a user and the task permission level of one or more corresponding RFID chips;
  a controller to determine whether to perform a print task based on the retrieved RFID information and to control the printing by the shared printer based on the determination; and
  a memory unit to store log information including a print count value corresponding to the RFID chip when the print task is completed,
  wherein if the user ID retrieved by the RFID transceiver unit is determined to be a pre-stored ID in the memory unit, the controller reduces a print count value corresponding to the RFID chip in the memory unit.

2. The shared printer of claim 1, wherein if the user ID retrieved by the RFID transceiver unit is determined to be a new ID, the controller stores information including the task permission level and the print count value corresponding to the RFID chip in the memory unit.

3. The shared printer of claim 1, wherein when the RFID transceiver unit retrieves RFID information from a plurality of RFID chips, the controller gives priority to the RFID chip having a highest task permission level.

4. The shared printer of claim 3, wherein the controller controls the memory unit to store log information including the print count value corresponding to each of the plurality of RFID chips after the print task corresponding to each of the plurality of the RFID chips are completed.

5. The shared printer of claim 1, wherein when the user ID retrieved by the RFID transceiver unit is determined to have a manager permission level, the controller controls a display unit to display the log information stored in the memory unit.

6. The shared printer of claim 5, wherein the display unit may display user ID-specific task log information stored in the memory unit and indicate as to whether the user ID is authenticated.

7. A method of controlling a shared printer with RFID to perform different tasks for users based on an authorized task permission level, the method comprising:

retrieving RFID chip information including user information from an external source;

performing the printing task corresponding to the retrieved RFID chip information if the retrieved RFID chip information includes the task permission level authorized to perform the task;

determining whether the retrieved RFID chip information corresponds to a new ID or a previously stored ID, and if the retrieved RFID chip information corresponds to a new ID, registering the new ID in a memory unit; and adjusting and storing an ID specific printing count value corresponding to a number of pages used in performing the task.

8. The method of claim 7, further comprising: storing an ID-specific task log for the performed task in a memory unit.

9. The method of claim 8, further comprising:
allowing a user with a manager permission level to access the ID-specific task log.

10. An image forming apparatus comprising:

a radio frequency identification (RFID) unit to retrieve information from a user regarding a level of user access to the image forming apparatus;

a controller to control the level of user access to the image forming apparatus based upon the level of user access; and a memory unit to store log information including a print count value corresponding to the RFID unit, wherein the RFID unit transmits and retrieves RFID information from RFID chips at uniform time intervals.

* * * * *